(12) United States Patent
Lin et al.

(10) Patent No.: US 6,958,890 B1
(45) Date of Patent: Oct. 25, 2005

(54) HEAD STACK ASSEMBLY INCLUDING LAMINATED NUT PLATE WITH DAMPING LAYER INTERPOSED BETWEEN METAL LAYERS

(75) Inventors: Chen-Chi Lin, San Jose, CA (US); Kamran Oveyssi, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 256 days.

(21) Appl. No.: 10/306,974

(22) Filed: Nov. 27, 2002

(51) Int. Cl.[7] .............................................. G11B 5/48
(52) U.S. Cl. .................................................. 360/244.6
(58) Field of Search .......................... 360/244.6, 244.5, 360/244.3, 244.7, 265.7, 265.9, 266, 266.1

(56) References Cited

U.S. PATENT DOCUMENTS

| | | | |
|---|---|---|---|
| 5,187,625 A | * | 2/1993 | Blaeser et al. ............ 360/244.3 |
| 5,877,919 A | * | 3/1999 | Foisy et al. ............... 360/244.6 |
| 5,956,210 A | * | 9/1999 | Kaneko .................... 360/244.6 |
| 2002/0181155 A1 | * | 12/2002 | Takagi et al. ............. 360/244.3 |
| 2003/0169537 A1 | * | 9/2003 | Weichelt et al. .......... 360/265.9 |
| 2003/0202284 A1 | * | 10/2003 | Arya ........................ 360/244.3 |

* cited by examiner

Primary Examiner—Angel Castro
(74) Attorney, Agent, or Firm—Stetina Brunda Garred & Brucker

(57) ABSTRACT

A head stack assembly for use in a disk drive. The head stack assembly includes an actuator body. The head stack assembly further includes an actuator arm extending from the actuator body. The actuator arm includes an arm tip portion. The head stack assembly further includes a suspension attached to the arm tip portion. The head stack assembly further includes a laminated nut plate attached to the arm tip portion and the suspension. The nut plate includes first and second metal layers and a damping layer interposed between the first and second metal layers for mitigating vibration of the suspension with respect to the actuator arm.

26 Claims, 3 Drawing Sheets

HEAD STACK ASSEMBLY INCLUDING LAMINATED NUT PLATE WITH DAMPING LAYER INTERPOSED BETWEEN METAL LAYERS

BACKGROUND OF THE INVENTION

1. Field of the Invention

This invention relates to disk drives. More particularly, this invention relates to an actuator arm assembly for a disk drive.

2. Description of the Prior Art and Related Information

A huge market exists for hard disk drives for mass-market host computer systems such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

Each of numerous contemporary mass-market hard disk drive models provides relatively large capacity, often in excess of 20 gigabytes per drive. Nevertheless, there exists substantial competitive pressure to develop mass-market hard disk drives that have even higher capacities and that provide rapid access. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, high capacity, and rapid access requires innovation in each of numerous components and methods of assembly including methods of assembly of various components into certain subassemblies. Typically, the main assemblies of a hard disk drive are a head disk assembly and a printed circuit board assembly.

The head disk assembly includes an enclosure including a base and a cover, at least one disk having at least one recording surface, a spindle motor for causing each disk to rotate, and an actuator arrangement. The printed circuit board assembly includes circuitry for processing signals and controlling operations.

Actuator arrangements can be characterized as either linear or rotary; substantially every contemporary cost-competitive small form factor drive employs a rotary actuator arrangement.

The rotary actuator arrangement is a collection of elements of the head disk assembly; the collection typically includes certain prefabricated subassemblies and certain components that are incorporated into the head disk assembly. The prefabricated assemblies include a pivot bearing cartridge and, in some cases, a prefabricated head stack assembly which may include the pivot bearing cartridge. Other components of the rotary actuator arrangement are permanent magnets and an arrangement for supporting the magnets to produce a magnetic field for a voice coil motor. The prefabricated head stack assembly includes a coil forming another part of the voice coil motor. The prefabricated head stack assembly also includes an actuator body having a bore through it, and a plurality of actuator arms projecting parallel to each other and perpendicular to the axis of the bore. The prefabricated head stack assembly also includes head gimbal assemblies that are supported by the arms. Each head gimbal assembly includes a suspension ("load beam") and a head supported by the suspension. The suspension typically includes a nut plate ("swage plate"). The suspension and hence the head gimbal assembly may be attached to the actuator arm via a swaging operation.

Providing rapid access as the drive capacities increase presents certain challenges such as the reduction of track misregistration ("TMR"). One of the contributors to TMR is the vibration of actuator arms due to high speed air impact between the actuator arms and turbulent airflow as the spindle motor rotates the disk. The air pressure difference due to turbulent airflow around a given actuator arm generates forces on the arm which causes the arm to vibrate. Accordingly, there is a need in the art for an improved head stack assembly in comparison to the prior art.

SUMMARY OF THE INVENTION

This invention can be regarded as a head stack assembly for use in a disk drive. The head stack assembly includes an actuator body. The head stack assembly further includes an actuator arm extending from the actuator body. The actuator arm includes an arm tip portion. The head stack assembly further includes a suspension. The head stack assembly further includes a laminated nut plate attached to and between the arm tip portion and the suspension. The nut plate includes first and second metal layers and a damping layer interposed between the first and second metal layers for mitigating vibration of the suspension with respect to the actuator arm.

According to various embodiments, the damping layer may be formed of a damped adhesive material. The damping layer may be formed of a viscoelastic polymer material. The damping layer 11 may be formed of an electrically conductive material. The first and second metal layers may be formed of steel. The first metal layer may be attached to the arm tip portion with the first metal layer and the damping layer disposed between the second metal layer and the arm tip portion. The nut plate may be disposed between the suspension and the arm tip portion. The first metal layer is adhesively attached to the arm tip portion. In another embodiment, the first metal layer includes a swage collar attached to the arm tip portion. In yet another embodiment, the second metal layer is attached to the arm tip portion with the first metal layer and the damping layer disposed between the second metal layer and the arm tip portion. In this regard, the first metal layer may include a first metal layer swage hole, and the damping layer may include a damping layer swage hole with the second metal layer including a swage collar extending through the damping layer swage hole and the first metal layer swage hole. The swage collar is attached to the arm tip portion.

According to another aspect of the present invention, there is provided a disk drive including a base, a rotatable disk, a spindle motor attached to the base for rotating the disk, and a head stack assembly disposed adjacent the disk. The head stack assembly is constructed as described above.

DESCRIPTION OF PREFERRED EMBODIMENTS

Figure 1:
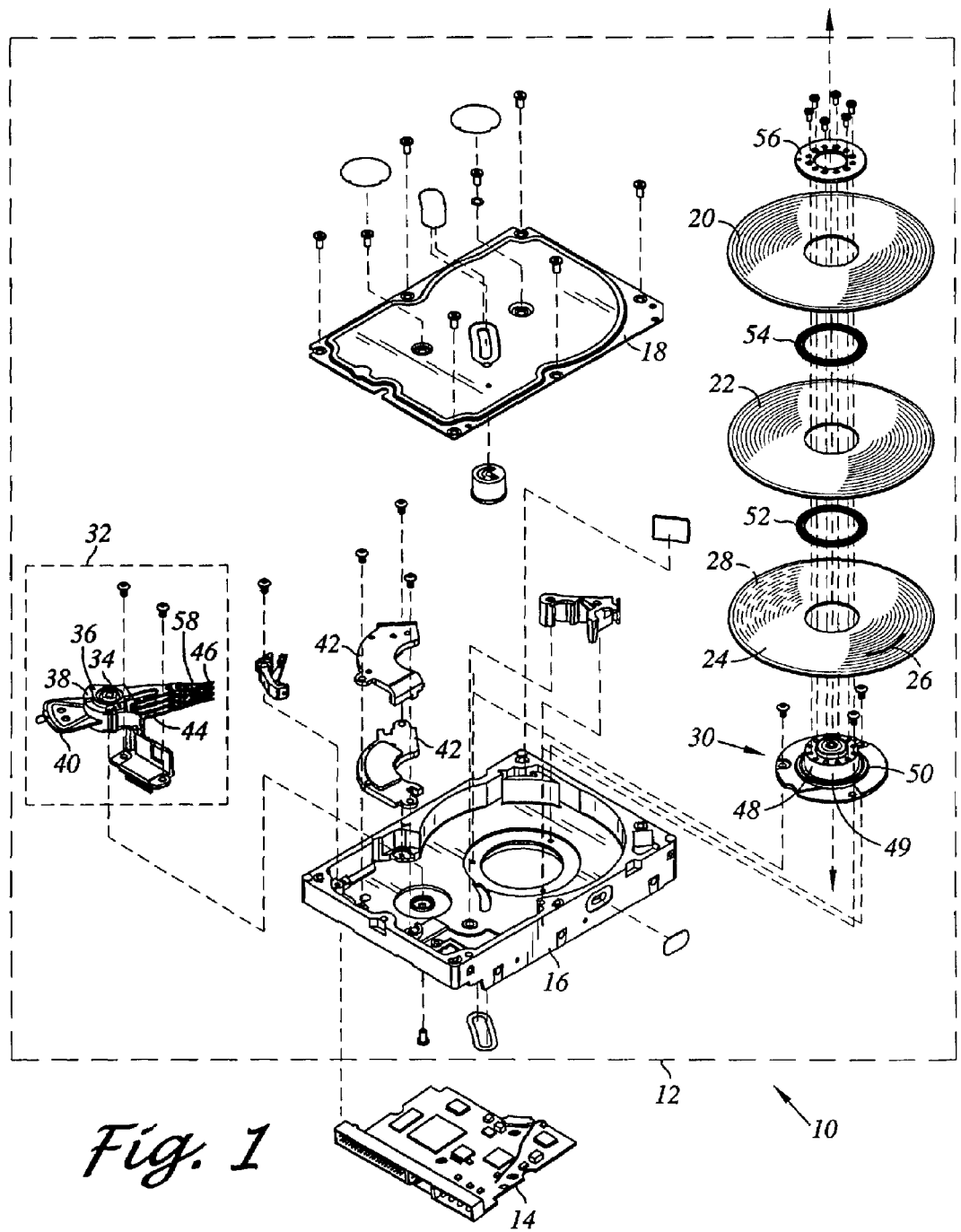
FIG. 1 is an exploded view of a disk drive incorporating an embodiment of this invention.

Referring now to the drawings wherein the showings are for purposes of illustrating preferred embodiments of the present invention only, and not for purposes of limiting the same, FIGS. 1–6 illustrate a disk drive and head stack assembly in accordance with the aspects of the present invention.

Referring now to FIG. 1 there is depicted an exploded perspective view of a disk drive 10 constructed in accordance with an aspect of the present invention. In the embodiment shown, the disk drive 10 includes a head disk assembly (HDA) 12 and a printed circuit board assembly (PCBA) 14. The head disk assembly 12 includes a disk drive base 16 and a cover 18 that collectively house magnetic disks 20, 22, 24. Each magnetic disk 20, 22, 24 contains a plurality of tracks for storing data. The magnetic disks 20, 22, 24 may be two-sided, and thus for example, the magnetic disk 24 is shown having a track 26 on an upper facing side and a track 28 (shown in phantom) on a lower facing side. The head disk assembly 12 further includes a spindle motor 30 for rotating the magnetic disks 20, 22, 24. The head disk assembly 12 further includes a head stack assembly 32 and a pivot bearing cartridge 34. The head stack assembly 32 includes a rotary actuator 36.

The rotary actuator 36 includes an actuator body 38 that has a bore and the pivot bearing cartridge 34 engaged within the bore for facilitating the rotary actuator 36 to rotate between limited positions. The rotary actuator 36 further includes a coil portion 40 that extends from one side of the actuator body 38 to interact with a pair of permanent magnets 42 to form a voice coil motor for pivoting the rotary actuator 36. A plurality of actuator arms, the lowermost one of which being representatively denoted 44, extend from an opposite side of the actuator body 38. As the disks 20, 22, 24 may be two sided, each of the actuator arms includes either one or two suspensions associated with the adjacent sides of the disks 20, 22, 24. Each suspension (the uppermost one being denoted 58) includes a head (the uppermost one being representatively denoted 46) for reading and writing data from and to the disks 20, 22, 24.

The spindle motor 30 includes a spindle motor hub 48 that is rotatably attached to the disk drive base 16. The spindle motor hub 48 has a hub body 49 and a hub flange 50 that extends from the hub body 49 to support a lowermost one of the disks, namely disk 24. The remaining disks 22, 20 are stacked and separated with annular disk spacers 52, 54 that are disposed about the hub body 49. A disk clamp 56 is attached about the spindle motor hub 48 and is utilized to apply a clamping force against the topmost disk 20 for securing all the disks 20, 22, 24 to the spindle motor hub 48.

The spindle motor 30 typically includes a spindle motor base that is attached to the disk drive base 12. A shaft is coupled to the spindle motor base and the spindle motor hub 48 surrounds the shaft. The spindle motor hub 48 may be rotatably coupled to the shaft and therefore the spindle motor base typically via a pair of bearing sets. A stator is positioned about the shaft and is attached to the spindle motor base. A magnet element is attached at a bottom portion of the hub flange 50. The stator includes windings that selectively conduct current to create a magnetic field that interacts with the various poles of the magnet element. Such interaction results in forces applied to the spindle motor hub 48 that tend to rotate the spindle motor hub 48 and the attached disks 20, 22, 24.

Figure 2:
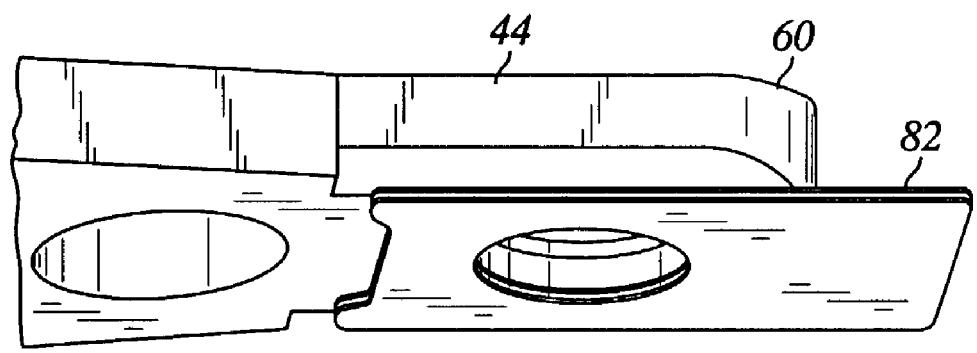
FIG. 2 is a perspective view of a portion of an actuator arm with a laminated nut plate according to another embodiment of this invention.
Figure 3:
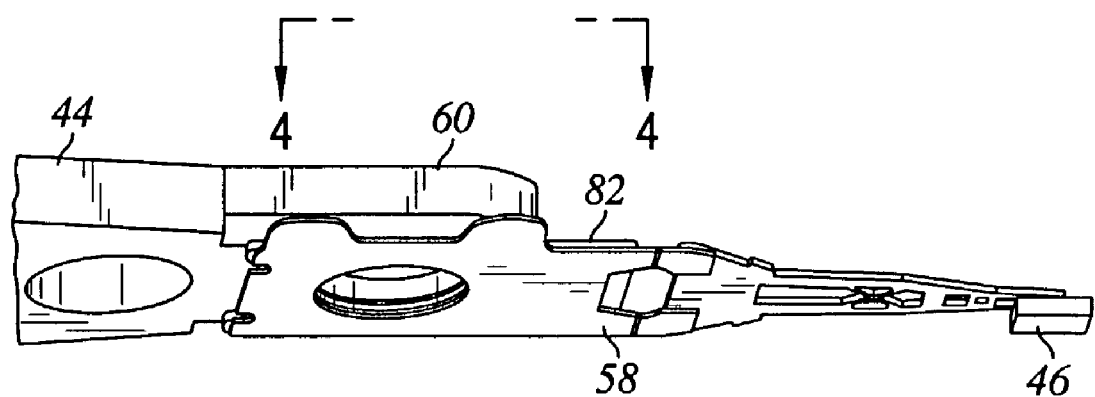
FIG. 3 is the portion of the actuator arm and the nut plate of FIG. 2 as shown with an attached suspension assembly.
Figure 4:
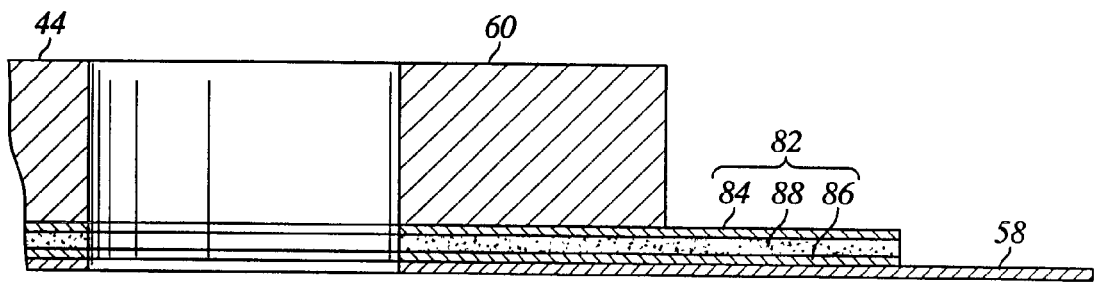
FIG. 4 is an enlarged cross sectional view of the portion of the actuator arm, the nut plate, and a portion of the suspension assembly of FIG. 3 as seen along axis 4—4.

Referring now to FIG. 2 there is depicted a perspective view a portion of the actuator arm 44 of the head stack assembly 32 of FIG. 1. The actuator arm 44 includes an actuator arm tip portion 60 that is shown with a laminated nut plate 82. FIG. 3 is the portion of the actuator arm 44 of FIG. 2 as shown with the attached suspension 58. FIG. 4 is an enlarged cross sectional view of the portion of the actuator arm tip portion 60 and a portion of the suspension 58 that includes the nut plate 82 of FIG. 3 as seen along axis 4—4.

Referring to FIGS. 1–4, an aspect of the invention can be regarded as the head stack assembly 32 for use in the disk drive 10. The head stack assembly 32 includes the actuator body 38. The head stack assembly 32 further includes the actuator arm 44 extending from the actuator body 38. The actuator arm 44 includes the arm tip portion 60. The head stack assembly 32 11 further includes a suspension 58 attached to the arm tip portion 60. The head stack assembly 32 further includes the laminated nut plate 82 attached to the arm tip portion 60 and the suspension 58. The nut plate 82 includes first and second metal layers 84, 86 and a damping layer 88 interposed between the first and second metal layers 84, 86 for mitigating vibration of the suspension 58 with respect to the actuator arm 44.

According to various embodiments, the damping layer 86 may be formed of a variety of materials that act to dampen vibration of the suspension 58. Various suitable materials may be utilized such as similar to a product PX-1 by MSC Laminates and Composites Inc. of Illinois that is configured for viscoelastic damping of vibrations between 200 and 20,000 hertz. The nut plate 82 may be formed through of a stamping process from sheet material forming the first and second metal layers 84, 86 and the damping layer 88. The nut plate 82 may have a thickness of 0.1 to 0.15 millimeters for example. The damping layer 88 may be formed of a damped adhesive material. In this regard, the nut plate 82 may be provided from a supplier in peel off sheet form with adhesive pre-applied to the nut plate 82 for ease of assembly with the head stack assembly 32. The damping layer 88 may be formed of a viscoelastic polymer material. Moreover, the damping layer 88 may be formed of an electrically conductive material. The first and second metal layers 84, 86 may be formed of steel.

The nut plate 82 and the suspension 58 may be attached to the arm tip portion 60 in a variety of ways. As shown in FIG. 4, the nut plate 82 is disposed between the suspension 58 and the arm tip portion 60. The nut plate 82 is directly adjacent and attached to the arm tip portion 60 and the suspension 58 is attached to the second metal layer 66 of the nut plate 82. In this regard, the suspension 58 is attached to the arm tip portion 60 via the nut plate 82. Though not shown, it is contemplated that the positioning of the nut plate 82 and the suspension 58 may be switched with the suspension 58 disposed between the nut plate 82 and the arm tip portion 60. In such a case, the nut plate 82 would be attached to the arm tip portion 60 via the suspension 58. The nut plate 82 may be attached to the suspension 58 such as with an electrically conductive adhesive or by welding for example.

As depicted in the embodiment shown in FIG. 4, the first metal layer 64 may be attached to the arm tip portion 62 with the first metal layer 62 and the damping layer 66 disposed between the second metal layer 66 and the arm tip portion 62. In this embodiment the first metal layer 84 is adhesively attached to the arm tip portion 60. The adhesive used to attach the nut plate 82 to the arm tip portion 60 as well as that used to form the damping layer 88 are preferably formed of an electrically conductive material so as to facilitate electrical grounding of the suspension 58.

Figure 5:
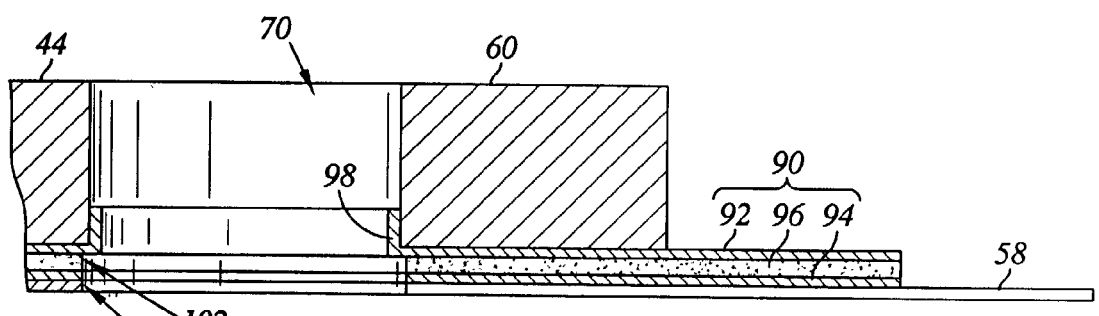
FIG. 5 is an enlarged cross sectional view of a portion of a head stack assembly similar to that shown in FIG. 4, however, according to another embodiment with a nut plate including a swage collar formed in a metal layer disposed adjacent an actuator tip portion.

Referring now to FIG. 5, in another embodiment, there is depicted a nut plate 90. FIG. 5 depicts a view similar to that of FIG. 4, however, with the nut plate 90 substituted for the nut plate 82. The nut plate 90 includes first and second metal layers 92, 94 and a damping layer 96. The first metal layer 92 includes a swage collar 98 attached to the arm tip portion 60. The arm tip portion 60 includes a swage opening 70. The suspension 58 includes a swage opening 100 and the nut plate 90 also includes a swage opening 102 to allow for a swaging operation for forming the swage collar 98 to engage the arm tip portion 60. In this regard, during the swaging operation, a portion of the first metal layer 92 adjacent the swage opening 70 is mechanically deformed into the swage opening 70 thereby forming the swage collar 98. Such mechanical deformation of the swage collar 98 in relation to the arm tip portion 60 is contemplated to result in engagement of the swage collar 98 to the arm tip portion 60 sufficient for supporting the nut plate 90 and the suspension 58. The damping layer 96 is preferably formed of an electrically conductive material so as to facilitate electrical grounding of the suspension 58.

Figure 6:
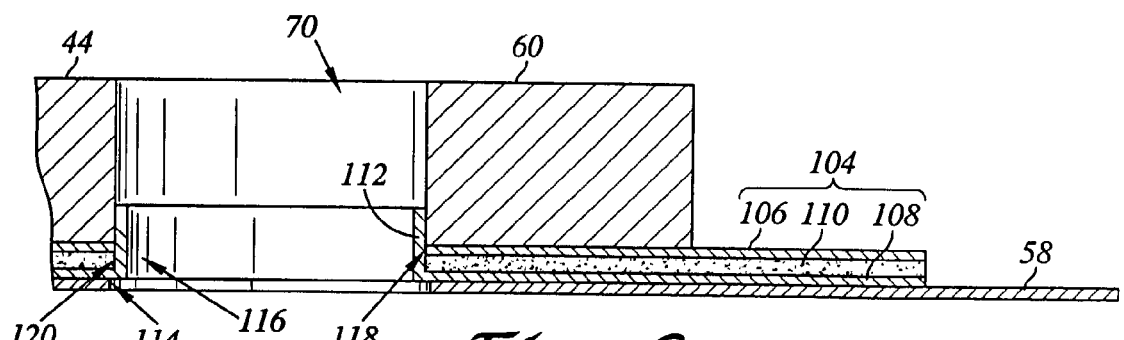
FIG. 6 is an enlarged cross sectional view of a portion of a head stack assembly similar to that shown in FIG. 4, however, according to another embodiment with a nut plate including a swage collar formed in another metal layer.

Referring now to FIG. 6, in another embodiment, there is depicted a nut plate 104. FIG. 6 depicts a view similar to that of FIG. 4, however, with the nut plate 104 substituted for the nut plate 82. The nut plate 104 includes first and second metal layers 106, 108 and a damping layer 110. The second metal layer 108 includes a swage collar 112 attached to the arm tip portion 60 with the first metal layer 106 and the damping layer 110 disposed between the second metal layer 108 and the arm tip portion 60. In this regard, the first metal layer 106 includes a first metal layer swage hole 118, and the damping layer 110 includes a damping layer swage hole 120. The swage collar 112 extends through the damping layer swage hole 120 and the first metal layer swage hole 118. The swage collar 112 is formed in the swage opening 70 from the second metal layer 108 during a swaging operation. As such, the suspension 58 may include a swage opening 114 and the nut plate 104 may include a swage opening 116 to facilitate the swaging operation for engagement of the swage collar 112 to the arm tip portion 60.

According to another aspect of the present invention, there is provided the disk drive 10 including the base 16, a rotatable disk (such as the disk 20), the spindle motor 30 attached to the base 16 for rotating the disk 20, and the head stack assembly 32 disposed adjacent the disk 20. The head stack assembly 32 is constructed as described above.

We claim:

1. A head stack assembly for use in a disk drive, the head stack assembly comprising:
    an actuator body;
    an actuator arm extending from the actuator body, the actuator arm including an arm tip portion;
    a suspension attached to the arm tip portion; and
    a laminated nut plate attached to the arm tip portion and the suspension, the nut plate including first and second metal layers and a damping layer interposed between the first and second metal layers for mitigating vibration of the suspension with respect to the actuator arm, the first metal layer being attached to the arm tip portion with the first metal layer and the damping layer disposed between the second metal layer and the arm tip portion, the first metal layer including a swage collar attached to the arm tip portion.

2. The head stack assembly of claim 1 wherein the damping layer is formed of a damped adhesive material.

3. The head stack assembly of claim 1 wherein the damping layer is formed of a viscoelastic polymer material.

4. The head stack assembly of claim 1 wherein the damping layer is formed of an electrically conductive material.

5. The head stack assembly of claim 1 wherein the first and second metal layers are formed of steel.

6. The head stack assembly of claim 1 wherein the nut plate is disposed between the suspension and the arm tip portion.

7. The head stack assembly of claim 1 wherein the damping layer is formed of an electrically conductive material.

8. A disk drive comprising:
    a base;
    a rotatable disk;
    a spindle motor attached to the base for rotating the disk;
    a head stack assembly disposed adjacent the disk, the head stack assembly comprising:
        an actuator body;
        an actuator arm extending from the actuator body, the actuator arm including an arm tip portion;
        a suspension attached to the arm tip portion; and
        a laminated nut plate attached to the arm tip portion and the suspension, the nut plate including first and second metal layers and a damping layer interposed between the first and second metal layers for mitigating vibration of the suspension with respect to the actuator arm, the first metal layer being attached to the arm tip portion with the first metal layer and the damping layer disposed between the second metal layer and the arm tip portion, the first metal layer including a swage collar attached to the arm tip portion.

9. The disk drive of claim 8 wherein the damping layer is formed of a damped adhesive material.

10. The disk drive of claim 8 wherein the damping layer is formed of a viscoelastic polymer material.

11. The disk drive of claim 8 wherein the damping layer is formed of an electrically conductive material.

12. The disk drive of claim 8 wherein the first and second metal layers are formed of steel.

13. The disk drive of claim 8 wherein the nut plate is disposed between the suspension and the arm tip portion.

14. The disk drive of claim 8 wherein the damping layer is formed of an electrically conductive material.

15. A head stack assembly for use in a disk drive, the head stack assembly comprising:
    an actuator body;
    an actuator arm extending from the actuator body, the actuator arm including an arm tip portion;
    a suspension attached to the arm tip portion; and
    a laminated nut plate attached to the arm tip portion and the suspension, the nut plate including first and second metal layers and a damping layer interposed between the first and second metal layers for mitigating vibration of the suspension with respect to the actuator arm, the second metal layer being attached to the arm tip portion with the first metal layer and the damping layer disposed between the second metal layer and the arm tip portion, the first metal layer including a first metal layer swage hole, the damping layer including a damping layer swage hole, the second metal layer including a swage collar extending through the damping layer swage hole and the first metal layer swage hole, the swage collar being attached to the arm tip portion.

16. The head stack assembly of claim 15 wherein the damping layer is formed of a damped adhesive material.

17. The head stack assembly of claim 15 wherein the damping layer is formed of a viscoelastic polymer material.

18. The head stack assembly of claim 15 wherein the damping layer is formed of an electrically conductive material.

19. The head stack assembly of claim 15 wherein the first and second metal layers are formed of steel.

20. The head stack assembly of claim 15 wherein the nut plate is disposed between the suspension and the arm tip portion.

21. A disk drive comprising:
   a base;
   a rotatable disk;
   a spindle motor attached to the base for rotating the disk;
   a head stack assembly disposed adjacent the disk, the head stack assembly comprising:
      an actuator body;
      an actuator arm extending from the actuator body, the actuator arm including an arm tip portion;
      a suspension attached to the arm tip portion; and
      a laminated nut plate attached to the arm tip portion and the suspension, the nut plate including first and second metal layers and a damping layer interposed between the first and second metal layers for mitigating vibration of the suspension with respect to the actuator arm, the second metal layer being attached to the arm tip portion with the first metal layer and the damping layer disposed between the second metal layer and the arm tip portion, the first metal layer including a first metal layer swage hole, the damping layer including a damping layer swage hole, the second metal layer including a swage collar extending through the damping layer swage hole and the first metal layer swage hole, the swage collar being attached to the arm tip portion.

22. The disk drive of claim 21 wherein the damping layer is formed of a damped adhesive material.

23. The disk drive of claim 21 wherein the damping layer is formed of a viscoelastic polymer material.

24. The disk drive of claim 21 wherein the damping layer is formed of an electrically conductive material.

25. The disk drive of claim 21 wherein the first and second metal layers are formed of steel.

26. The disk drive of claim 21 wherein the nut plate is disposed between the suspension and the arm tip portion.

* * * * *